N. H. FREEMAN.
APPARATUS FOR MEASURING THE EVAPORATION OF LIQUIDS.
APPLICATION FILED FEB. 1, 1911.
1,014,139.
Patented Jan. 9, 1912.
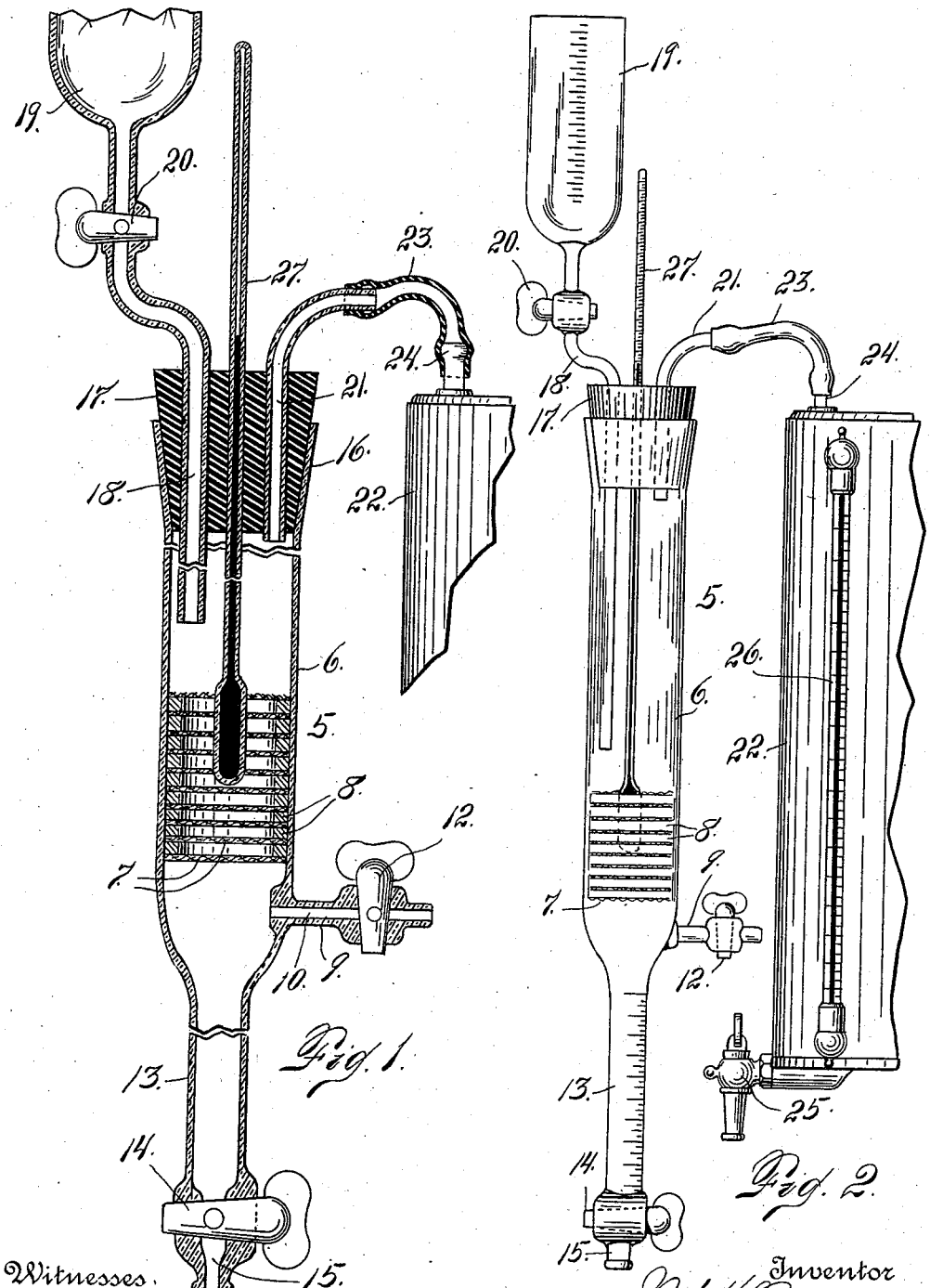

UNITED STATES PATENT OFFICE.

NAT H. FREEMAN, OF BOULDER, COLORADO.

APPARATUS FOR MEASURING THE EVAPORATION OF LIQUIDS.

1,014,139.      Specification of Letters Patent.      Patented Jan. 9, 1912.

Application filed February 1, 1911. Serial No. 606,045.

*To all whom it may concern:*

Be it known that I, NAT H. FREEMAN, a citizen of the United States, residing at Boulder, in the county of Boulder and State of Colorado, have invented certain new and useful Improvements in Apparatus for Measuring the Evaporation of Liquids; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for accurately measuring the evaporation or volatility of liquids. Through its agency I determine the relative proportion of air required to volatilize a given quantity of liquid, as gasolene. By virtue of this instrument the relative qualities of different grades of the same volatile product or of different volatile products may be ascertained.

In my improved device I employ a receptacle for holding the liquid whose volatility is to be determined; a receiver containing a porous element for the purpose of breaking up the liquid which flows thereto from the liquid receptacle in order to facilitate its evaporation; means connected with the receiver below the porous element for introducing air for purposes of evaporation; a suction-producing device connected with the receiver; a receptacle below the point where air is introduced to the receiver for holding the unevaporated liquid; and a thermometer for registering the temperature produced by the evaporation.

Having briefly outlined my improved instrument, I will proceed to describe the same in detail, reference being made to the accompanying drawing in which is illustrated an embodiment thereof.

In this drawing: Figure 1 is a sectional view taken through the device, the suction-producing means being shown in elevation and chiefly broken away. Fig. 2 is an elevation of the same, the parts being shown on a smaller scale.

The same reference characters indicate the same parts in all the views.

Let the numeral 5 designate a receiver, which is preferably composed of glass. The body portion 6 of this receiver contains a series of porous layers, disks or diaphragms 7 arranged one above another and separated by spacing rings 8. Just below the lowermost porous diaphragm 7 the receiver is equipped with a nipple 9 having a passage 10 controlled by a valve 12, whereby air may be turned on or cut off from the receiver at will. Below this nipple the receiver is reduced in size as shown at 13, the lower extremity of this reduced part being normally closed by a valve 14, which, however, may be opened when it is desired to draw off the liquid contents of the receiver, the latter being open below the valve 14 as shown at 15.

The upper extremity of the receiver is preferably outwardly flared as shown at 16 to receive a stopper 17, preferably composed of rubber. Passing through this rubber stopper is a glass tube 18 whose lower extremity protrudes into the receiver above the porous element, and whose upper extremity communicates with a receptacle 19 for the liquid whose volatility is to be determined. Located within this tube 18 intermediate its extremities is a valve 20 whereby the flow of liquid from the receptacle to the receiver may be controlled at will. A second glass tube 21 passes through the stopper 17 and protrudes above the same, its outer extremity being connected with a water tank 22 by means of a flexible tube 23, one extremity of which is slipped over the end of the tube 21, while its opposite extremity is applied to a nipple 24 secured to the top of the tank, the nipple having a passage whereby the tank and receiver are placed in communication with each other when the parts are connected as illustrated in the drawing.

Connected with the lower extremity of the tank 22 is a draw-off faucet 25. The tank 22 is also equipped with a gage glass 26 so that the depth of liquid therein at all times may be determined. This gage glass is also graduated in order that the quantity of water in the tank, measured in terms of any predetermined liquid unit, will be indicated.

Passing through the stopper 12 of the receiver is a thermometer 27 whose bulb or lower extremity is introduced into the porous element composed of the separated foraminous or mesh diaphragms 7. The thermometer protrudes above the top of the stopper, whereby the temperature determined by the evaporation of the liquid may be ascertained.

The lower reduced part 13 of the receiver is preferably graduated and figures placed thereon to indicate the quantity of unevaporated liquid remaining in the receiver after any test or after the quantity of liquid originally placed within the receptacle 19 has been delivered to the receiver under the conditions necessary for evaporating it or determining its volatile quality.

When the device is in use it may be assumed that the tank 22 is filled with liquid, preferably water, and that a predetermined quantity of liquid whose volatility is to be tested is placed within the receptacle 19. The valve 20 is then opened to allow the liquid from the receptacle 19 to pass into the receiver; and the valves 12 and 25 are simultaneously opened, allowing the liquid to escape from the tank 22 and the air to enter the receiver below the porous element. The escape of water or other liquid, as the case may be, from the tank 22 produces suction in the receiver whereby air is drawn out of the latter into the tank above the liquid, to break the vacuum in the tank 22. This suction in the receiver above the porous element causes the air from the atmosphere passing through the nipple 9 to pass rapidly up through the porous element simultaneously with the downward passage of the volatile liquid through the said element, thus producing ideal conditions for the volatilization or evaporation of the liquid.

Attention is called to the fact that the receptacle 19 is graduated so that the quantity of liquid placed therein may be readily determined. Hence after this liquid has all been delivered to the receiver the quantity of air which has been brought in contact therewith is indicated by the space in the tank 22 above the liquid. This is determined by the graduations on the gage glass, in connection with which any desired indicating characters may be employed. At the same time the amount of unevaporated liquid will be indicated by the figures on the graduated part 6 at the lower extremity of the receiver. In this way the exact relative proportion of air required for evaporating a given quantity of liquid may be ascertained; and it is in this way that the volatile quality of the liquid may be compared with another grade of the same kind of liquid or with another liquid, according to the purpose of the test. At the same time the thermometer indicates the variation in temperature from normal, resulting from the cooling influence incident to the evaporation of the liquid within the receiver.

If desired the delivery of liquid from the receptacle 19 to the receiver may be so regulated that it will all enter the receiver during the time that the entire quantity of liquid is escaping from the tank 22. By virtue of this arrangement the comparative volatility of different liquids may be readily ascertained. That is, by placing the same quantity of liquid in the receiver and regulating the flow of the liquid to the receiver and the liquid from the tank 22 in the same manner, the volume of the tank 22 being known, if all of the liquid has escaped from the tank during the time that the liquid in the receiver 19 is subjected to the test, it will be understood that an amount of air required to fill the tank 22 has been employed in the evaporation of this charge of liquid.

Having thus described my invention, what I claim is:

1. In an apparatus for measuring the evaporation of liquids, the combination of a receiver containing a porous element, means for introducing the liquid to be volatilized above the porous element, means for introducing air below the porous element, and a liquid-containing tank in communication with the receiver above the porous element for producing suction within the receiver by the escape of liquid from the tank, substantially as described.

2. An apparatus for measuring the volatility of liquids, comprising a vertically disposed receiver, a porous element located therein intermediate its extremities, means for introducing liquid to be evaporated above the porous element, means for introducing air below the porous element, and means for introducing suction above the porous element, the lower portion of the receiver below the porous element being reduced in size and graduated to indicate the quantity of unevaporated liquid, substantially as described.

3. In an instrument of the class described, the combination of a vertically disposed receiver having a porous element interposed therein between its extremities, the said element consisting of a number of porous diaphragms arranged one above another and suitably spaced, means for introducing liquid above and air below the porous element, means for producing suction above the porous element, and means inserted in the receiver and protruding therefrom for measuring the temperature in the receiver during the process of evaporation, substantially as described.

4. In a device of the class described, the combination of a vertically disposed receiver whose body portion contains a porous element, means for introducing a volatile liquid into the receiver above the porous element, means for regulating the flow of said liquid, means for introducing air to the receiver below the porous element, and a liquid-containing tank in communication with the receiver for producing suction therein by the escape of liquid from the tank, whereby the volume of air employed to volatilize a given quantity of liquid may be determined.

5. In a device of the class described, the combination of a vertically disposed receiver, a porous element interposed therein and composed of a series of foraminous diaphragms arranged one above another and suitably spaced, the portion of the receiver below the porous element being reduced in size and graduated for liquid measuring purposes, means for introducing air between the said graduated portion of the receiver and the porous element, a graduated liquid-containing receptacle in communication with the receiver by a valve-controlled passage, and means for producing suction in the receiver to facilitate the passage of air through the porous element, the suction-producing device being equipped to measure the quantity of air employed in the volatilization of a given quantity of liquid, substantially as described.

6. In a device of the class described, a closed receiver vertically disposed, containing a porous element intermediately located, means for introducing liquid to be volatilized, means for introducing air to facilitate volatilization, and a liquid containing tank in communication with the receiver for producing suction by the escape of the liquid from the said tank whereby the quantity of air employed in the volatilization of a given quantity of liquid may be determined.

7. In apparatus for the volatilization of liquids, the combination of a vertically disposed receiver having a porous element located intermediate its extremities, the lower portion of the receiver being reduced in size and graduated to measure the unevaporated liquid, means at the lower extremity of the graduated portion for drawing off the unevaporated liquid, a graduated liquid receptacle in communication with the receiver above the porous element by a valve-controlled passage, and a liquid-containing tank in communication with the receiver for producing suction and measuring the volume of air employed in the evaporation of a given quantity of liquid, provision being made for allowing the liquid to escape from the tank, the latter being equipped with means for indicating the depth of liquid in the tank at any time, substantially as described.

8. In apparatus for measuring the evaporation of liquid, the combination of a receiver containing a porous element located intermediate its extremities, the receiver being vertically arranged, the upper extremity of the receiver being closed by a suitable stopper, a tube passing through the said stopper, a receptacle having liquid in communication with the tube, a second tube passed through the stopper, a liquid-containing tank with which the second tube is in communication, means for introducing air into the receiver below the porous element, and means inserted in the receiver and protruding therefrom for measuring the temperature within the receiver during the process of evaporation, substantially as described.

9. In apparatus of the class described, the combination with a normally closed receiver, means for introducing liquid thereto to be volatilized, means for introducing air into receiver below the point where the liquid enters, a liquid containing tank in communication with the receiver for producing suction within the receiver by the escape of liquid from said tank, and means mounted on the said tank for indicating the quantity of air employed in the evaporation of a given quantity of liquid, substantially as described.

In testimony whereof I affix my signature in presence of two witnesses.

NAT H. FREEMAN.

Witnesses:
 HORTENSE UHLRICH,
 F. E. BOWEN.